(12) United States Patent
Pan et al.

(10) Patent No.: US 9,497,162 B2
(45) Date of Patent: *Nov. 15, 2016

(54) INTERFACE GROUPS FOR RULE-BASED NETWORK SECURITY

(71) Applicant: Fortinet, Inc., Sunnyvale, CA (US)

(72) Inventors: Yixin Pan, Burnaby (CA); Hongwei Li, Burnaby (CA); Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,896

(22) Filed: Jun. 9, 2015

(65) Prior Publication Data
US 2016/0080321 A1    Mar. 17, 2016

Related U.S. Application Data

(63) Continuation of application No. 14/484,191, filed on Sep. 11, 2014, now Pat. No. 9,088,544.

(51) Int. Cl.
*H04L 29/06* (2006.01)

(52) U.S. Cl.
CPC ....... *H04L 63/0209* (2013.01); *H04L 63/0263* (2013.01); *H04L 63/0272* (2013.01)

(58) Field of Classification Search
CPC ...................................... H04L 63/02
USPC ......................................... 726/11
See application file for complete search history.

(56) References Cited

U.S. PATENT DOCUMENTS

| | | | | |
|---|---|---|---|---|
| 6,954,792 | B2 * | 10/2005 | Kang | ...................... H04L 63/10 709/203 |
| 7,475,239 | B2 * | 1/2009 | Fulkerson, Jr. | ....... H04L 63/168 709/220 |
| 9,088,544 | B1 | 7/2015 | Pan et al. | |
| 2003/0182580 | A1 * | 9/2003 | Lee | .......................... H04L 12/24 726/11 |
| 2006/0101516 | A1 * | 5/2006 | Sudaharan | .......... H04L 63/0263 726/23 |

OTHER PUBLICATIONS

Notice of Allowance for U.S. Appl. No. 14/484,191 mailed Jun. 10, 2015.
Final Rejection for U.S. Appl. No. 14/484,191 mailed Feb. 5, 2015.
Non-Final Rejection for U.S. Appl. No. 14/484,191 mailed Oct. 27, 2014.

* cited by examiner

*Primary Examiner* — Longbit Chai
(74) *Attorney, Agent, or Firm* — Hamilton, DeSanctis & Cha LLP

(57) ABSTRACT

Systems and methods for designating interfaces of a network security appliance as source/destination interfaces in connection with defining a security rule are provided. According to one embodiment, a security rule configuration interface is displayed through which a network administrator can specify parameters of security rules to be applied to traffic attempting to traverse the network security appliance. Information defining a traffic flow to be controlled by a security rule is received via the security rule configuration interface. The information defining the traffic flow includes: (i) a set of source interfaces; and (ii) a set of destination interfaces. At least one of which includes multiple interfaces such that the security rule permits the traffic flow to be defined in terms of multiple source interfaces and/or multiple destination interfaces.

20 Claims, 5 Drawing Sheets

INTERFACE GROUPS FOR RULE-BASED NETWORK SECURITY

CROSS-REFERENCE TO RELATED APPLICATIONS

This application is a continuation of U.S. patent application Ser. No. 14/484,191, filed Sep. 11, 2014, now U.S. Pat. No. 9,088,544, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014-2015, Fortinet, Inc.

BACKGROUND

Field

Embodiments of the present invention generally relate to the field of network security techniques. In particular, various embodiments relate to configuration of security rules of a rule-based security device using interface groups.

Description of the Related Art

Firewalls are an integrated collection of security measures designed to prevent unauthorized access to a networked computer system. It may also assume the form of a flow control device or set of devices configured to permit, deny, encrypt, decrypt, or proxy all computer traffic between different security domains based upon a set of rules and other criteria. Organizations that use Internet Protocol (IP) based communication networks have firewalls or access control devices/mechanisms to control the traffic that crosses into and out of their networks, or between different network segments. Each firewall is basically a special-purpose computer that is enforcing the organization's traffic filtering policy.

Typically, the filtering policy is implemented in a rulebase, wherein each rule consists of a set of fields that collectively define a traffic flow to which the rule pertains, and an associated action that is used to control the defined traffic flow. In a security rule, a traffic flow may be identified by address, user-identity or device identity. The traffic flow may further be identified by its source interface, i.e., the interface by which the traffic flow arrives at the firewall, and its destination interface, i.e., the interface by which the traffic flow is routed out of the firewall.

In defining a traffic flow, the source or destination interface may be any one of the network interfaces of the firewall. The firewall may also designate "any interface" as the source and/or destination interface in a rule. That means the traffic flow that the rule is controlling can be from/to any interface of the firewall. However, accepting the traffic from/to any interface may expose the network to potential leaks and the network administrator may prefer to allow the traffic between some but not all of the interfaces of the firewall in one rule. In order to accept a traffic flow between only a proper subset of all the interfaces of a firewall in one rule, some of the firewall's interfaces may be defined as a zone and then, the zone may be designated as a source and/or destination of the rule so that a traffic flow between multiple interfaces may be controlled by one rule. Another option is to configure multiple rules in full mesh to control the traffic between the multiple interfaces. However, configuring rules in full mesh is not convenient for the network administrator and makes the rule set complicated for maintenance.

There is therefore a need for systems and methods that allow more efficient and flexible configuration of rules for a network security appliance.

SUMMARY

Systems and methods are described for designating a proper subset of interfaces of a network security appliance as source/destination interfaces in connection with defining a security rule pertaining to a traffic flow. According to one embodiment, a security rule configuration interface is displayed through which a network administrator can specify parameters of multiple security rules to be applied to network traffic attempting to traverse the network security appliance through interfaces of the network security appliance. Information defining a traffic flow to be controlled by a security rule is received by the network security appliance via the security rule configuration interface. The information defining the traffic flow includes: (i) a set of source interfaces of the interfaces, representing a proper subset of the interfaces, from which traffic associated with the traffic flow being defined may be received by the network security appliance; and (ii) a set of destination interfaces of the interfaces, representing a proper subset of the interfaces, through which traffic associated with the traffic flow being defined may be transmitted by the network security appliance if the security rule allows the traffic flow. At least one of the set of source interfaces and the set of destination interfaces includes multiple interfaces such that the security rule permits the traffic flow to be defined in terms of multiple source interfaces and/or multiple destination interfaces. Information regarding the action to be performed on the network traffic when the network traffic matches the security rule is received by the network security appliance via the security rule configuration interface. The security rule is stored by the network security appliance as part of a ruleset to be applied to the network traffic.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 3 illustrates an exemplary rule set with multiple full mesh rules that control a traffic flow between multiple interfaces of a firewall.

FIG. 4 illustrates an exemplary rule that controls a traffic flow between multiple interfaces of a firewall in accordance with an embodiment of the present invention.

DETAILED DESCRIPTION

Figure 1:
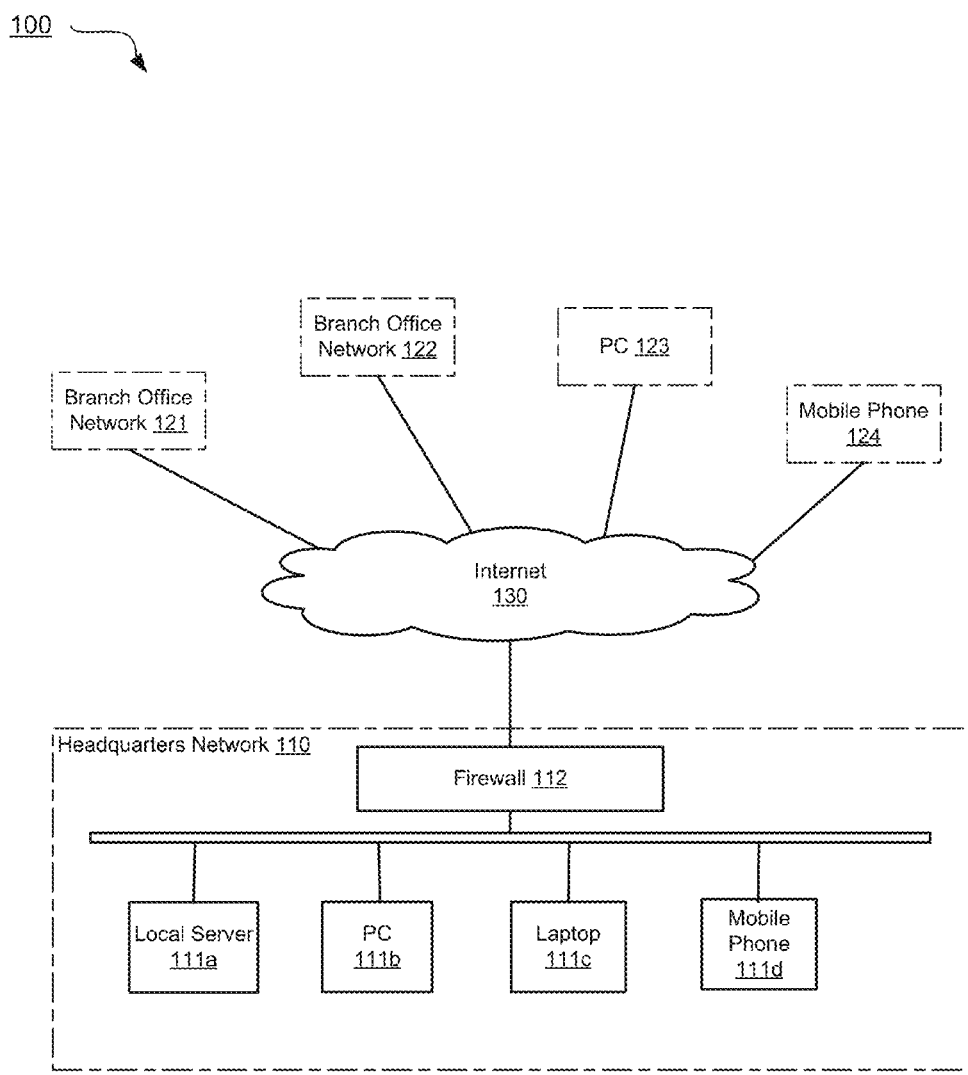
FIG. 1 illustrates an exemplary network architecture in accordance with an embodiment of the present invention.

Systems and methods are described for designating a proper subset of interfaces of a network security appliance as sources/destinations in connection with defining a security rule pertaining to a traffic flow. According to one embodiment, when a security rule is created or edited at a network security appliance, multiple interfaces but not all interfaces of the network security appliance are selected as sources and/or destinations of a traffic flow that is controlled by the security rule. An action for controlling the traffic between the sources and the destinations is set. The security rule is stored at the network security appliance for controlling the traffic flow that is defined at least in part by the sources and destinations.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "security device" generally refers to a hardware device or appliance configured to be coupled to a network and to provide one or more of data privacy, protection, encryption and security. The network security appliance can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security appliances include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

FIG. 1 illustrates an exemplary network architecture in accordance with an embodiment of the present invention. Network system 100 shown in FIG. 1 comprises a headquarters network 110, multiple branch office networks 121 and 122. The headquarters network 110 and branch office networks 121 and 122, PC 123 and mobile phone 124 are connected through internetworks, such as the Internet 130. Headquarters network 110 comprises multiple network appliances, such as local server 111a, PC 111b, laptop 111c, mobile phone 111d and other computing devices that are operatively coupled to each other through a Local Area Network (LAN), wherein the LAN is then operatively coupled with firewall 112 which enables access to Internet 130. Firewall 112 separates the external computing environment, represented by Internet 130, from the internal computing environment of headquarters network 110. Firewall 112 may intercept communications between Internet 130 and the network appliances of headquarters network 110 and scan for, among other things, malware, viruses or other high risk network accesses. The internal structures of branch office networks 121 and 122 are omitted as they may be the same as that of headquarters network 110.

In the embodiment shown in FIG. 1, firewall 112 is a rule-based security device that controls traffic going through its interfaces. Usually, firewall 112 may comprise multiple physical network interfaces, such as an internal interface with 4-24 or more Ethernet ports, 1-4 or more wide area network (WAN) interfaces, one demilitarized zone (DMZ) interface. Further, when the private network is separated into multiple virtual LANs (VLANs), firewall 112 may also define multiple virtual interfaces for each of the VLANs. Firewall 112 comprises a rule set that includes multiple rules that are created by the administrator of network system 100 and control the traffic going through firewall 112. In each rule, the traffic is identified by source interfaces, destination interfaces, source IP addresses, destination IP addresses, users/user groups, devices and/or other parameters of the traffic flow to be controlled. In one embodiment of the present invention, multiple interfaces of firewall 112 may be selected as the source/destination of traffic in a single rule. The multiple interfaces can be interfaces, but not all, of physical interfaces, virtual interfaces or zones of firewall 112. Usually, multiple interfaces that belong to the same category may be selected as source in a rule. For example, multiple VLAN interfaces may be selected as sources/destinations of the traffic in a rule. However, different categories of interfaces may be also allowed as sources/destinations of a traffic flow in a rule. For example, an internal interface and a WAN interface or a physical interface and a virtual interface may be selected in a rule as the sources/destinations of traffic. In this scenario, a warning message may be provided to the network administrator before the rule containing multiple categories of interfaces can be stored at firewall 112. After the traffic flow is defined, an action, such as accept or deny, controlling the traffic flow is designated in each rule. In operation, all traffic going through interfaces of firewall 112 is captured by firewall 112. The source interface, destination interface and other parameters of the captured traffic flow are matched with those of each rule of a rule set. The first matched rule in the rule set is used for controlling the traffic flow and the traffic flow is processed based on the action defined in the matched rule.

Figure 2:
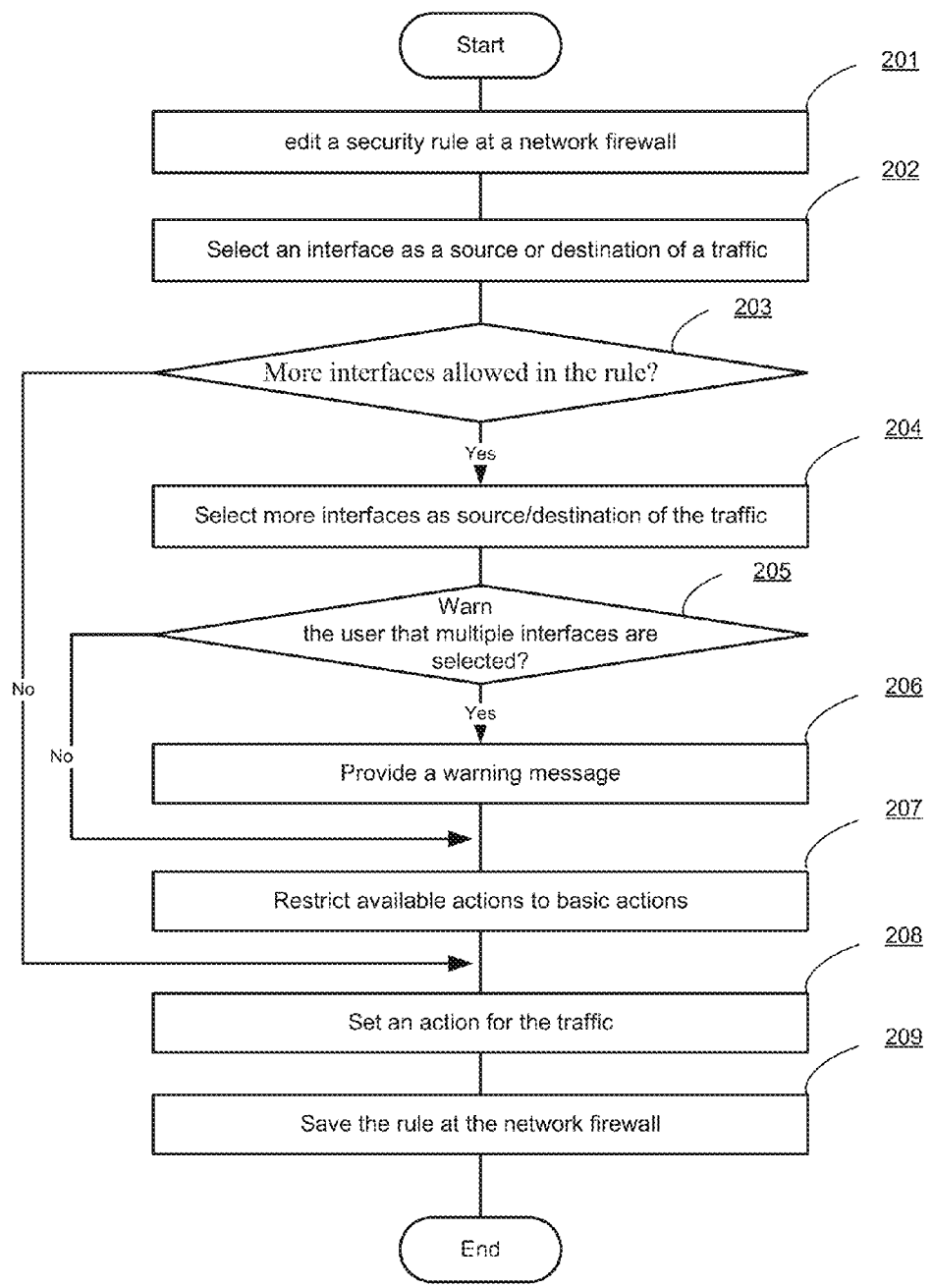
FIG. 2 is a flow diagram illustrating a method for editing a rule with multiple interfaces as sources/destinations of a traffic flow in accordance with an embodiment of the present invention.

FIG. 2 is a flow diagram illustrating a method for editing a rule with multiple interfaces as sources/destinations of a traffic flow in accordance with an embodiment of the present invention. In the context of the present example, a rule is edited or created at a rule-based security device, such as firewall 112 of FIG. 1. In the rule that is being edited/created, multiple interfaces, but not all, of the security device may be selected as sources or destinations of a traffic flow.

At block 201, a rule is edited or created at a security device. When a firewall or a network management appliance that managing multiple firewalls in a large private network is deployed, the network administrator may edit and deploy a set of rules for provisioning and managing the traffic or contents going through the network. The rules may be created by the network administrator or copied from existing rules. When editing a rule, the rule may designate a traffic flow by its addresses, user-identities or device identities. The traffic may be further identified by the source interfaces through which it is received by the firewall and/or the destination interfaces through which it is transmitted. Further details regarding designating multiple interfaces in a rule as sources/destinations are described below.

At block 202, a first interface is selected as sources/destinations of the traffic that is provisioned by the rule. The first interface may be any interface of the security device, such as a physical interface, a virtual interface or a zone that comprises one or more interfaces of the security device.

At block 203, the first interface selected at block 202 is checked to determine if more interfaces are allowed to be selected in the rule. The firewall may check the category of the selected interface and determine if any other interfaces may be combined with the selected interface in the same rule. In some embodiments, if the selected interface is designated as "any," the traffic from/to any interface of the security device will be provisioned by the rule. In such as case, the rule does not need to designate other interfaces as all the interfaces of the security device are already covered by the "any" designation. In some other embodiments, the security device may not allow a rule to have multiple interfaces as sources/destinations when the selected interface belongs to a designated category. For example, when a tunnel interface and another non-tunnel interface are selected in the same rule as sources/destinations, the tunnel-related action defined in the rule may conflict with the non-tunnel interface. Another example of when multiple interfaces designated as sources/destinations for a rule may not be permitted is when such interfaces include multiple WAN interfaces so as to avoid possible leakage in the rule set.

If no further interfaces are allowed to be added to the rule, the process branches to block 208 and an action of the rule is designated and the rule is saved to a rule set at the security device at block 209. If additional interfaces are allowed to be added to the rule, the process continues with block 204 and one or more additional interfaces may be selected for addition to the rule as traffic sources/destinations.

At block 205, the security device determines if a warning message should be provided to the user. When multiple source/destination interfaces are designated in the same rule, this single rule may be treated by the firewall as multiple full mesh rules in which each of the interfaces is designated as a single source/destination interface. It is helpful to show a warning message to the network administrator such full mesh rules will be created.

In some other embodiments, the categories of the multiple interfaces selected at blocks 202 and 204 are checked to determine if a warning message should be displayed to the network administrator. Usually, the network administrator creates a rule to control a traffic flow from interfaces of the same category because interfaces of different categories are used to connect different kinds of networking appliances. For example, in a private network, such as network 110 of FIG. 1, internal devices may be connected to internal interfaces of firewall 112 and Internet 130 may connect to a WAN interface of firewall 112. Multiple VLANs or zones may be created by the administrator to further separate devices of the network depending on the locations or functions of the devices. As security requirements for the networking appliances are different, the network administrator usually creates a rule for traffic from/to interfaces that belong to the same categories. When the multiple interfaces of a rule belong to different categories, such as when the first interface specified as the source of the rule is an internal interface and when the second interface is a WAN interface, the rule may incur some leaks in controlling the traffic if the rule set is not properly created. As such, in one embodiment, it is determined that a warning message should be displayed to the network administrator when the multiple interfaces specified by a rule belong to different categories.

At block 206, if has been determined in decision block 205 that a warning message should be provided to the network administrator, for example, as a result of multiple interfaces or multiple categories of interfaces having been selected in the same rule. As such, a confirmation message may be fed back through a user interface of the security device and an affirmative confirmation may be required from the network administrator before the process continues.

At block 207, options for actions that may be used for provisioning the traffic defined in the rule may be listed for selection. When multiple interfaces are allowed to be specified as sources/destinations in the same rule, the network administrator needs to make extra effort to make sure that there re no leaks in the rule set and the rules in the rule set do not conflict with each other. In some embodiments, available options for actions that may be selected in a rule may be restricted when multiple interfaces are selected as sources/destinations. For example, when multiple interfaces are selected in the same rule as sources/destinations, tunnel-related actions may incur conflicts among the multiple interfaces if the actions are carried out on the traffic from/to the multiple interfaces. Therefore, the security device may forbid tunnel-related operations as actions in the rule when multiple interfaces are selected as sources/destinations. In some other embodiments, only basic actions, such as allow or deny, are available to be selected in a rule in which multiple interfaces are selected as sources/destinations so that the logical relationship between the rules may be simplified.

At block 208, an action of the rule is designated and the rule is saved to a rule registry at the security device at block 209. The firewall may use rules to control the traffic between the multiple interfaces defined in the rule. Similarly, a security management appliance may also use the rule that comprises multiple interfaces as sources/destinations to centrally manage firewalls of a network and efficiently apply policies and distribute content security/firmware updates.

Figures 3, 4:
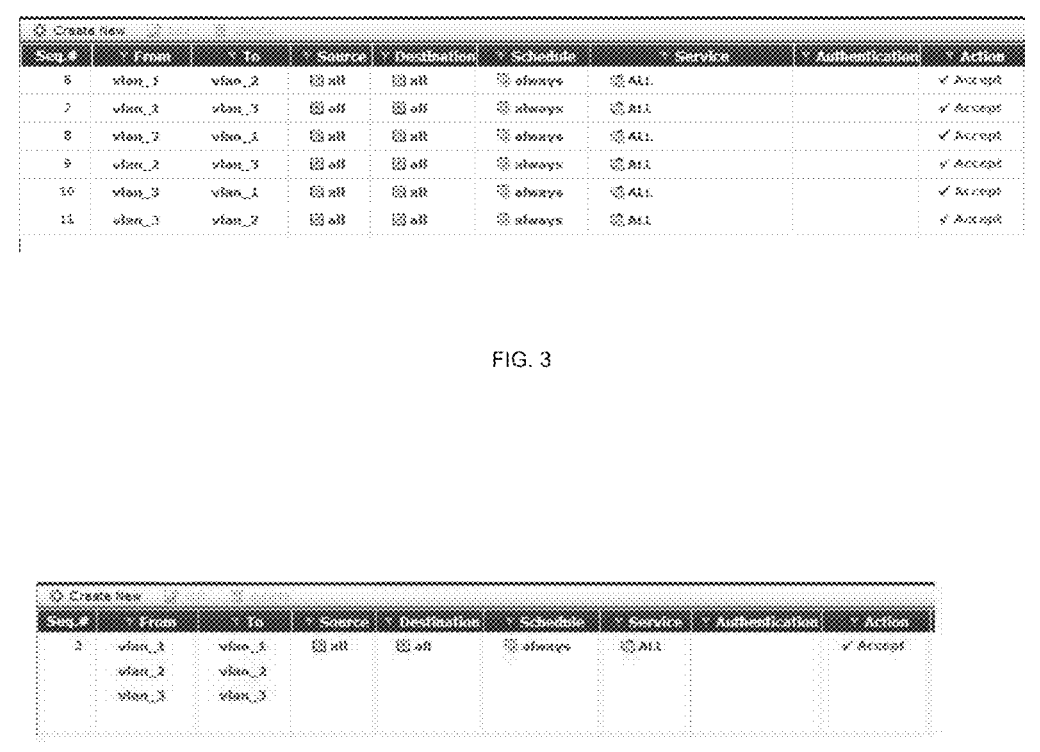

FIG. 3 illustrates an exemplary rule set with multiple full mesh rules that control traffic flow among multiple interfaces of a firewall. According to this example, three VLANs are created and a total of 6 rules in a rule set are necessary for allowing full mesh communications among these VLANs. FIG. 4 illustrates an exemplary rule that controls traffic flow among multiple interfaces of a firewall in accordance with an embodiment of the present invention. In the present embodiment, a single rule specifying multiple sources and multiple destinations is sufficient to represent the 6 rules of FIG. 3. As can be seen from this example, allowing multiple interfaces as sources/destinations (i.e., the "From" and "To" columns) in the same rule can result in a greatly reduced number of rules needed for managing traffic among multiple interfaces of a security device. It is also convenient and flexible for the network administrator to manage the traffic between multiple interfaces without creating or changing zones of interfaces.

Figure 5:
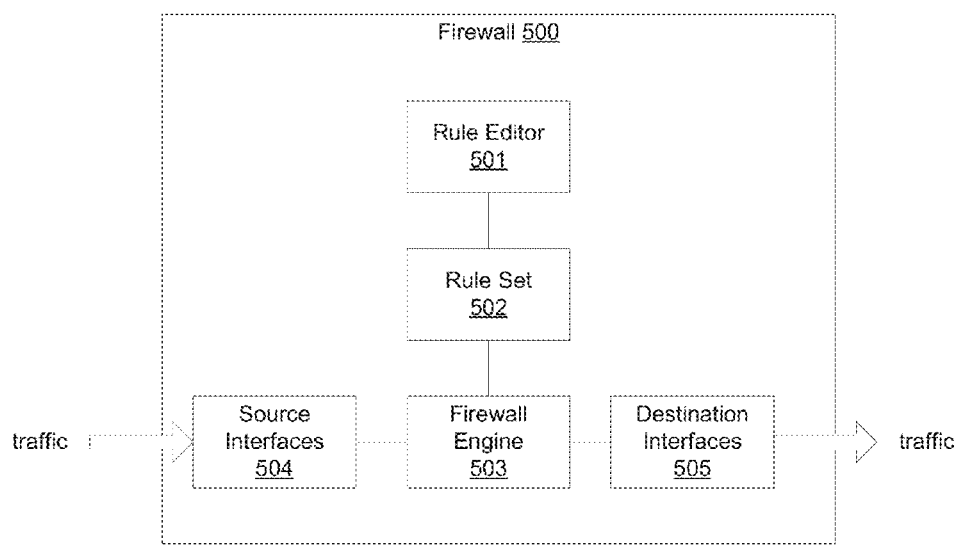
FIG. 5 illustrates exemplary functional units of a network security appliance in accordance with an embodiment of the present invention.

FIG. 5 illustrates exemplary functional units of a network security appliance 500 in accordance with an embodiment of the present invention. In the present embodiment, firewall 500 comprises a rule editor 501, a rule set 502, a firewall engine 503, source interfaces 504 and destination interfaces 505.

In the present embodiment, rule editor 501 provides a user interface to the network administrator to, among other things, create, copy, edit, backup and/or restore rules that control traffic going through firewall 500. The user interface may be a graphical user interface (GUI), such as shown in FIGS. 3 and 4, or a command line interface (CLI). In the present embodiment, rule editor 501 has a GUI and the network administrator creates or edits a rule that comprises multiple interfaces as sources/destinations. When a rule is edited, a drop-down list of available interfaces as source of the rule and another drop-down list of available interfaces as destination may be shown for selection. The interfaces may include internal interfaces, WAN interfaces, DMZ interfaces, VLAN interfaces, interface zones and the like. A drop-down list of actions to be selected for controlling the traffic by the rule may also be shown. These actions may include, but are not limited to, "accept", "deny", "SSL-VPN", "IPSec-VPN" and the like. As these lists may be shown simultaneously on the GUI, it is possible that the network administrator may first select from any one of the lists. Depending on which list is selected first, rule editor 501 may have different operation to ensure the rule will be created correctly.

In one scenario, the network administrator may first select multiple interfaces as a source or destination of the rule from the drop-down list. Then, rule editor 501 may provide a warning message to the network administrator if multiple interfaces are selected as sources/destinations in the rule. In another embodiment, rule editor 501 may compare the categories of the multiple interfaces that are selected as sources/destinations of the rule. If the multiple interfaces belong to different categories, then a warning message may be shown to the network administrator and a confirmation may be received from the network administrator before the rule is saved in the firewall 500. In a further embodiment, rule editor 501 may determine if a selected interface is a tunnel-related interface, if the selected interface is a tunnel-related interface, rule editor 501 may be configured to limit selection to only one interface as the source interface and only one interface as the destination interface of the rule. After source/destination interfaces are selected, rule editor 501 may restrict the drop-down list of candidate actions. For example, rule editor 501 may disable tunnel or VPN-related actions from the drop-down list or limit the actions in the drop-down list to basic actions. Next, the network administrator may select an action that will control the traffic defined by the source/destination and other parameters of the rule.

In another scenario, when the network administrator first selects an action from the drop-down list of actions, rule editor 501 may determine if the selected action is an action for which multiple source/destination interfaces are allowed. For example, if the selected action is not a tunnel or VPN-related action or if the selected action is a basic action, rule editor 501 may allow multiple selections for the source interface and multiple selections from the destination interface from the drop-down lists. Otherwise, only one interface may be selected for each of the source interface and the destination interface.

After a rule is created or edited, the rule is stored in rule set 502. When network traffic is captured by firewall 500, the source interface, destination interface and other parameters of the traffic are matched with those in the rules of rule set 502. In one embodiment, firewall engine 503 sequentially evaluates the rules in rule set 502 and compares the source/destination interface of the traffic with multiple source/destination interfaces designated in a rule. The first matched rule in the rule set 502 is used for controlling the traffic. If the action specified by the matched rule is "deny," then the traffic is blocked by firewall 500. If the action of the matched rule is "accept" or another operation, firewall engine 503 executes the corresponding operation and the traffic is sent to the destination devices through destination interfaces 505. It shall be apparent to one skilled in the art that source interfaces 504 and destination interfaces 505 are not fixed on firewall 500. A source interface is simply the interface on which traffic arrives at firewall 500 and a destination interface is simply the interface on which the traffic is transmitted out of firewall 500. As such, any individual or group of logical, virtual or physical network interfaces of firewall 500 may be considered as a source interface or a destination interface in the context of this specification.

Figure 6:
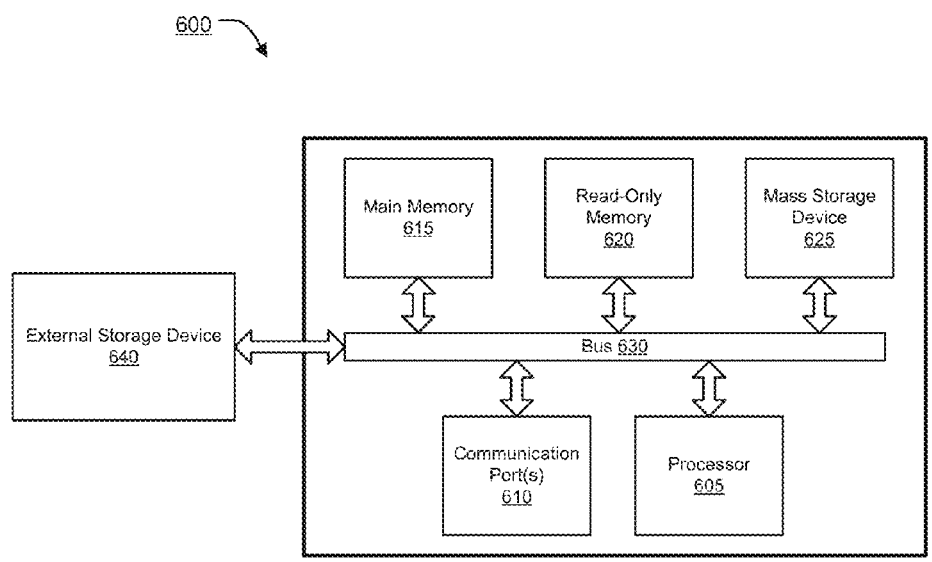
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    causing to be displayed, by a network security appliance, a security rule configuration interface through which a network administrator can specify parameters of a plurality of security rules to be applied to network traffic attempting to traverse the network security appliance through one or more of a plurality of interfaces of the network security appliance;
    receiving, by the network security appliance via the security rule configuration interface, parameters defining a traffic flow to be controlled by a security rule of the plurality of security rules, wherein the parameters defining the traffic flow include:
    a set of source interfaces of the plurality of interfaces, representing a proper subset of the plurality of interfaces, from which traffic associated with the traffic flow being defined can be received by the network security appliance;
    a set of destination interfaces of the plurality of interfaces, representing a proper subset of the plurality of interfaces, through which traffic associated with the traffic flow being defined can be transmitted by the network security appliance if the security rule allows the traffic flow; and
    wherein at least one of the set of source interfaces and the set of destination interfaces includes multiple interfaces of the plurality of interfaces such that the security rule permits the traffic flow to be defined, at least in terms of multiple source interfaces and multiple destination interfaces; and
    receiving, by the network security appliance via the security rule configuration interface, information regarding an action to be performed on the network traffic when the network traffic matches the security rule;
    storing, by the network security appliance, the security rule as part of a ruleset to be applied to the network traffic.

2. The method of claim 1, wherein the multiple interfaces comprise one or more of internal interfaces, wide area network (WAN) interfaces, demilitarized zone (DMZ) interfaces, virtual interfaces and interface zones.

3. The method of claim 1, wherein the multiple interfaces comprise at least two interfaces from different interface categories.

4. The method of claim 1, further comprising:
    determining, by the network security appliance, whether the multiple interfaces include interfaces from different interface categories by comparing interface categories associated with the multiple interfaces;
    when said determining is affirmative, then providing, by the network security appliance via the security rule configuration interface, a warning message to the network administrator regarding the existence of the interfaces from different interface categories within the security rule.

5. The method of claim 1, further comprising:
    determining, by the network security appliance, that the set of source interfaces or the set of destination interfaces specifies more than one of the plurality of interfaces; and
    responsive to said determining, restricting, by the network security appliance, permissible actions that may be defined for the security rule.

6. The method of claim 5, wherein the permissible actions comprise basic actions limited to either allowing or denying matching network traffic.

7. The method of claim 5, wherein the permissible actions exclude Virtual Private Network (VPN) related actions.

8. The method of claim 1, further comprising:
    determining, by the network security appliance, whether a selected interface of the multiple interfaces is a tunnel-related interface;
    when said determining is affirmative, then configuring the security rule configuration interface to limit selection to only one interface as the source interface and only one interface as the destination interface of the security rule.

9. The method of claim 1, further comprising, when the action to be performed on the network traffic is selected in the security rule configuration interface, determining, by the network security appliance, whether the selected action is an action for which multiple source interfaces are allowed.

10. The method of claim 1, further comprising, when the action to be performed on the network traffic is selected in the security rule configuration interface, determining, by the network security appliance, whether the selected action is an action for which multiple destination interfaces are allowed.

11. A non-transitory computer-readable storage medium embodying a set of instructions, which when executed by one or more processors of a network security appliance, cause the one or more processors to perform a method comprising:
    causing to be displayed a security rule configuration interface through which a network administrator can specify parameters of a plurality of security rules to be applied to network traffic attempting to traverse the network security appliance through one or more of a plurality of interfaces of the network security appliance;
    receiving via the security rule configuration interface parameters defining a traffic flow to be controlled by a security rule of the plurality of security rules, wherein the parameters defining the traffic flow include:
    a set of source interfaces of the plurality of interfaces, representing a proper subset of the plurality of interfaces, from which traffic associated with the traffic flow being defined can be received by the network security appliance;
    a set of destination interfaces of the plurality of interfaces, representing a proper subset of the plurality of interfaces, through which traffic associated with the traffic flow being defined can be transmitted by the network security appliance if the security rule allows the traffic flow; and wherein at least one of the set of source interfaces and the set of destination interfaces includes multiple interfaces of the plurality of interfaces such that the security rule permits the traffic flow to be defined, at least in terms of multiple source interfaces and multiple destination interfaces; and receiving via the security rule configuration interface information regarding an action to be performed on the network traffic when the network traffic matches the security rule;

storing the security rule as part of a ruleset to be applied to the network traffic.

12. The non-transitory computer-readable storage medium of claim 11, wherein the multiple interfaces comprise one or more of internal interfaces, wide area network (WAN) interfaces, demilitarized zone (DMZ) interfaces, virtual interfaces and interface zones.

13. The non-transitory computer-readable storage medium of claim 11, wherein the multiple interfaces comprise at least two interfaces from different interface categories.

14. The non-transitory computer-readable storage medium of claim 11, wherein the method further comprises:
determining whether the multiple interfaces include interfaces from different interface categories by comparing interface categories associated with the multiple interfaces;
when said determining is affirmative, then providing via the security rule configuration interface a warning message to the network administrator regarding the existence of the interfaces from different interface categories within the security rule.

15. The non-transitory computer-readable storage medium of claim 11, wherein the method further comprises:
determining that the set of source interfaces or the set of destination interfaces specifies more than one of the plurality of interfaces; and
responsive to said determining, restricting permissible actions that may be defined for the security rule.

16. The non-transitory computer-readable storage medium of claim 15, wherein the permissible actions comprise basic actions limited to either allowing or denying matching network traffic.

17. The non-transitory computer-readable storage medium of claim 15, wherein the permissible actions exclude Virtual Private Network (VPN) related actions.

18. The non-transitory computer-readable storage medium of claim 11, wherein the method further comprises:
determining, by the network security appliance, whether a selected interface of the multiple interfaces is a tunnel-related interface;
when said determining is affirmative, then configuring the security rule configuration interface to limit selection to only one interface as the source interface and only one interface as the destination interface of the security rule.

19. The non-transitory computer-readable storage medium of claim 11, wherein the method further comprises, when the action to be performed on the network traffic is selected in the security rule configuration interface, determining, by the network security appliance, whether the selected action is an action for which multiple source interfaces are allowed.

20. The non-transitory computer-readable storage medium of claim 11, wherein the method further comprises, when the action to be performed on the network traffic is selected in the security rule configuration interface, determining, by the network security appliance, whether the selected action is an action for which multiple destination interfaces are allowed.

* * * * *